US011122090B2

(12) United States Patent
Verma et al.

(10) Patent No.: US 11,122,090 B2
(45) Date of Patent: Sep. 14, 2021

(54) DYNAMIC APPLICATION-LEVEL COMPLIANCE ENFORCEMENT

(71) Applicant: VMWARE, INC., Palo Alto, CA (US)

(72) Inventors: Gaurav Verma, Bangalore (IN); Manjunath Subramani, Bangalore (IN); Suchit Shivashankar, Bangalore (IN); Karthikeyan Palanisamy, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 273 days.

(21) Appl. No.: 16/294,962

(22) Filed: Mar. 7, 2019

(65) Prior Publication Data

US 2020/0220903 A1 Jul. 9, 2020

(30) Foreign Application Priority Data

Jan. 3, 2019 (IN) .............................. 201941000340

(51) Int. Cl.
*G06F 21/00* (2013.01)
*H04L 29/06* (2006.01)
*G06F 21/62* (2013.01)
*G06F 21/51* (2013.01)

(52) U.S. Cl.
CPC ............ *H04L 63/205* (2013.01); *G06F 21/51* (2013.01); *G06F 21/629* (2013.01)

(58) Field of Classification Search
CPC ........ G06F 21/12; G06F 21/121; G06F 21/50; G06F 21/51; G06F 21/52; G06F 21/57; H04L 63/20; H04L 63/205
See application file for complete search history.

(56) References Cited

U.S. PATENT DOCUMENTS

| | | | | |
|---|---|---|---|---|
| 2014/0040979 | A1* | 2/2014 | Barton | G06F 21/72 726/1 |
| 2014/0059642 | A1* | 2/2014 | Deasy | G06F 21/31 726/1 |
| 2014/0289511 | A1* | 9/2014 | Tuch | G06F 21/6281 713/156 |

* cited by examiner

*Primary Examiner* — Edward Zee
(74) *Attorney, Agent, or Firm* — Clayton, McKay & Bailey, PC (57) ABSTRACT

Examples herein describe systems and methods for application-specific compliance enforcement. An example method can include receiving, at a user device, profiles containing application-specific restrictions. When a first application is opened, a management agent compares the corresponding application-specific restrictions with current device settings. This can be done with a checksum comparison where the checksums are created based on a hash with an application- or profile-specific identifier. If they differ, the management agent stores the current device settings and prompts for, or automatically changes, the device settings to new compliant values before allowing the first application to operate in the foreground of the user device screen. If the first application is closed or minimized, the stored device settings can be restored. The management agent can compare those against application-specific restrictions of the second application before allowing the second application to run in the foreground.

20 Claims, 8 Drawing Sheets

DYNAMIC APPLICATION-LEVEL COMPLIANCE ENFORCEMENT

RELATED APPLICATIONS

Benefit is claimed under 35 U.S.C. 119(a)-(d) to Foreign Application Serial No. 201941000340 filed in India entitled "DYNAMIC APPLICATION-LEVEL COMPLIANCE ENFORCEMENT", on Jan. 3, 2019, by VMware, Inc., which is herein incorporated in its entirety by reference for all purposes.

BACKGROUND

Compliance enforcement can allow an entity, such as an enterprise, to manage a large number of devices without compromising on security. A system administrator can craft compliance rules that are applied to a managed device. The compliance rules can be used to assess the status of a device and, if necessary, take some sort of action with respect to that device. They can also be used to prevent access to sensitive data unless certain conditions are met. For example, a user device can be restricted from accessing a database when located in a geofence associated with a competitor, or when connected to an unmanaged WIFI network.

Traditionally, compliance is evaluated and enforced at a central server or by a dedicated agent installed on the managed device. For example, a managed device can include management software (the agent) that collects status information about the device and transmits that information to the server. The status information can include information relating to software or firmware on the device, the geographic location of the device, or any other information about the status of the device. The server receives this information and determines whether any compliance rules are being violated. If a violation occurs, the server can determine a remedial action and cause the device to carry out that action. The agent application can also locally enforce some compliance rules on the managed device, such as disallowing access to any managed applications or enterprise data when the user device is non-compliant.

However, the broad application of compliance rules across all applications often lacks the granularity required by some enterprise customers. A device can restrict use of a resource even when only one or two managed applications actually require the restriction. This prevents other applications from using the resource. For example, a managed application for accessing enterprise files might require disabling BLUETOOTH, also making it impossible for the user device to broadcast a phone call over BLUETOOTH. Compliance concerns can vary across different applications.

Despite this reality, administrators are forced to make a single compliance policy that causes all applications on a managed device to be restricted in a similar way. For example, if the compliance rule evaluation (whether at the agent or a compliance server) detects that a device is in an untrusted location, the rules would typically restrict all corporate connections in a similar way. This can also cause administrators to assign more lenient compliance policies than ideal based on resources that are needed by some applications and not others. For example, mobile networks might be required for emergency services, so an administrator might not disable this even though it would provide greater security to do so when viewing enterprise files. It would be preferred to have control of enforcing compliance rules on an application-by-application basis to account for differing security requirements and scenarios.

As a result, a need exists for dynamic application-level compliance enforcement that can be evaluated and enforced on the device itself, on an application-by-application basis.

SUMMARY

Examples described herein include systems and methods for dynamic application-level compliance enforcement. An example method can include receiving, at a user device from a management server, a profile including first compliance settings for a first application that are different than second compliance settings for a second application. The compliance settings can be application-specific, and the profile can include different compliant settings for any number of applications. Each application can have its own profile, or its compliance settings can be described within a single profile. Once such profile is a launcher profile, which can enumerate various applications that are available within a launcher application. These can be traditional non-managed applications in one example, but management can be carried out on the launcher itself to control access to these applications based on the compliance policies.

The user device can detect launch of the first application, such as within the launcher. A management agent on the device can make this detection. For example, the launcher can broadcast (or otherwise send) an intent to the management agent. In another example, the first application is a managed application that communicates with the management agent. A launcher need not be involved in some examples. The management agent can be part of the first application, an operating system of the user device, or a stand-alone application on the computing device.

The management agent can check first compliance settings in the profile for the first application against current device settings. If a change is needed, the management agent can store current device settings that correspond to the first compliance settings. For example, if the first compliance settings correlate to three device settings, at least the current values of those three device settings can be stored. Example device settings include WIFI enablement, device encryption, BLUETOOTH enablement, privacy settings, cellular data, allowing mobile networks, USB debugging, and screenshot enablement, among many others.

The management agent can determine whether the current device settings meet the first compliance settings by comparing the required values of the first compliance settings against the current values of the device settings. In one example, this can be done by comparing checksums. For example, the management agent can create a first checksum based on the current device settings. The first checksum can be a hash of at least the corresponding values of the current settings and some other value, such as an application identifier ("ID"), profile ID, or package ID associated with compliance settings. The management agent can similarly create a second checksum of the first compliance settings. Comparing these two checksums can reveal if the current device settings meet the application-specific compliance settings.

If the comparison reveals a need to change current device settings to comply with the application-specific restrictions, the management agent can store the current device settings. This can include storing the first checksum. Then the management agent can automatically change the needed device settings to meet the compliance settings. Alternatively, the management agent can prompt the user to manually do so.

The management agent can compare the new device settings to the application-specific compliance settings to ensure compliance has been achieved.

Once the device settings comply, the management agent can allow the first application to execute. This can include notifying the launcher, which then allows the application to execute in a foreground. Alternatively, the management agent can move its own interface from a foreground position so that the first application can execute in the foreground.

A similar process can repeat if the second application is launched. The second application can have different device restrictions but performing these steps can ensure that the device settings are adjusted to meet compliance on an application-by-application basis. These methods can be performed by systems described herein. Additionally, instructions stored on a non-transitory, computer-readable medium can cause a processor to perform stages for carrying out these methods.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples herein describe systems and methods for dynamic application-specific compliance enforcement. In one example, a user device can receive different compliance settings for first and second applications. When a user opens or otherwise brings the first application into the foreground, the user device can compare the compliance settings needed to execute the first application to the current device settings. The comparison can be done by comparing checksums representative of the compliance and device settings. If they are different, the user device can store the current device settings and prompt the user regarding changing the device settings to match the compliance settings. The user device can automatically make this change in one example, which can then allow the first application to execute. When the first application is closed or minimized, the user device can reset the device settings to the saved device settings.

The same method can allow the user to open or maximize the second application while ensuring that the different compliance settings for that application are enforced. For example, the second compliance settings are compared to the current device settings. When the comparison indicates compliance, the second application can continue execution. When the second application is closed or minimized, the original device settings can be restored.

Figure 1:
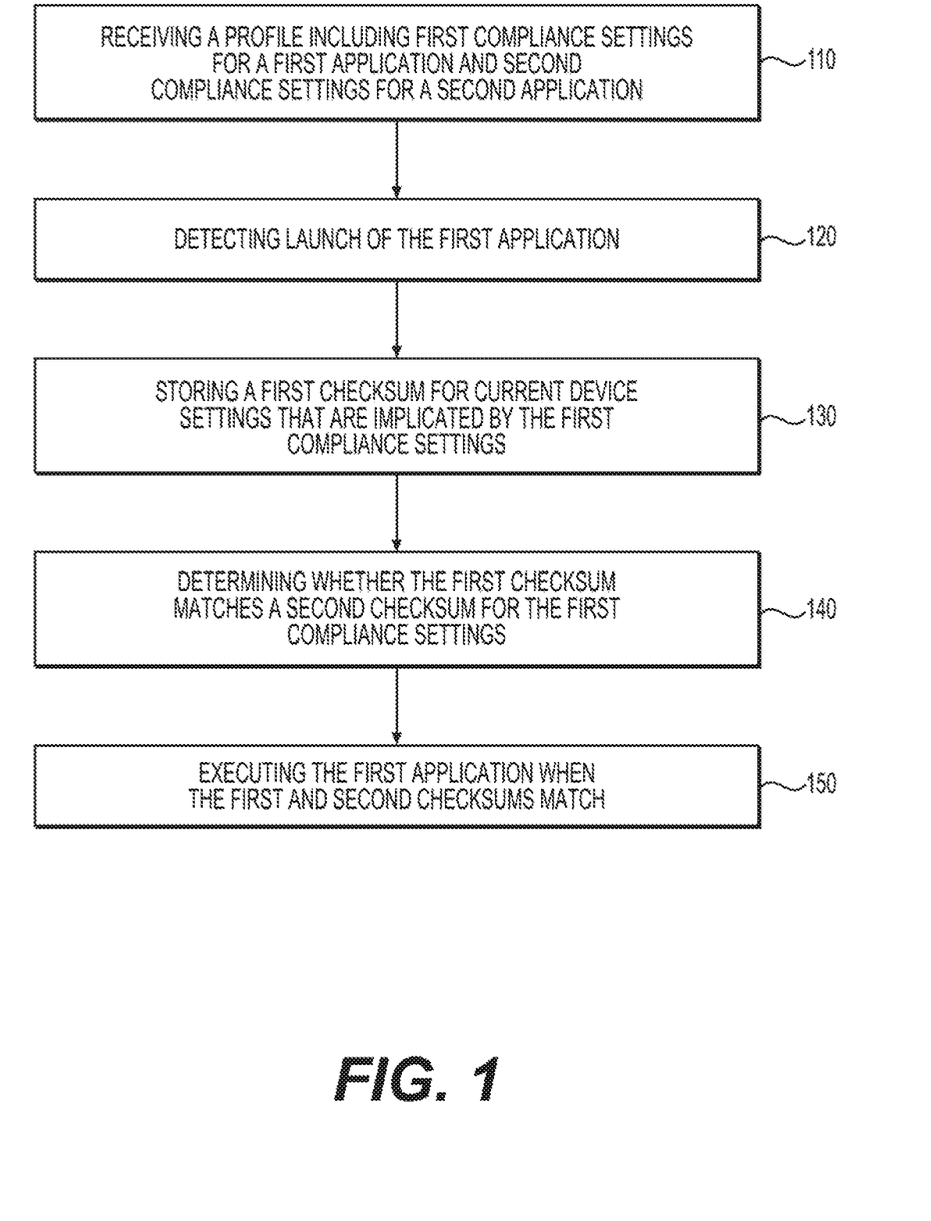
FIG. 1 is a flowchart of an example method for performing dynamic compliance enforcement.

FIG. 1 illustrates an example method for performing dynamic application-level compliance enforcement. At stage 110, a user device can receive a profile that includes first compliance settings for a first application. The user device can be any computing device, such as a smartphone, laptop, tablet, personal computer, or workstation. The user device can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others. The user device can also include various hardware accessories such as a camera, microphone, speaker, accelerometer, gyroscope, GPS transmitter, wireless-internet transmitter, NFC transmitter, or other hardware. The user device can execute an operating system that manages system resources and other software installed on the device. The user device can also execute software applications.

The first compliance settings can indicate device settings that are required for operation of the first application. For example, the first compliance settings can require disabling BLUETOOTH and disabling network access when the first application is in use. In one example, the specific compliance settings can be assigned to the first application by an administrator of an enterprise mobility management ("EMM") system. For example, the administrator can use a console to make this assignment. The console can also allow for assigning different compliance settings to different applications. The profile can indicate which compliance settings are assigned to one or more applications. In one example, a single profile can indicate different compliance settings for multiple applications. In another application, each application can have its own profile that indicates which compliance settings are required.

A compliance rule can set forth one or more conditions that must be satisfied for a user device or an application to be deemed compliant. A condition can be positive or negative—that is, a positive condition must be met in order for the user device or application to be compliant, while a negative condition must be absent in order for the user device or application to be compliant. The compliance rule can be executed by the application engine. In one example, the application engine can check an identifier to determine whether a particular compliance rule is intended for that particular application engine rather than one executing as part of a different application.

If compliance is broken, the remedial action can be taken by the compliance engine of the application. Compliance rules can be tailored to the user or application. For example, an application may be unable to run or certain functions may be disabled. Additionally, users within a certain organizational group can receive a different compliance rule than users within a different organizational group. Compliance rules can also be tailored to the user device, such that certain types of user devices receive a different compliance rule than other types of user devices—even where the different user devices belong to the same user. Compliance rules can also be specific to an application, as mentioned above. At stage 120, the application can store the compliance rule in a memory storage location on the user device that is accessible to the application. In one example, the storage location can be a shared location accessed by compliance engines of multiple different applications.

In one example, the profile can be a launcher profile that is used by a launcher on the user device. The launcher can be an application downloaded from the management server in an example. The launcher can allow the user to open various other applications from within the launcher application. For example, these applications can operate in a virtual environment created by the launcher. In some examples, the launcher can function as a replacement interface for the user device, such that the "home screen" of the user device is replaced by, or diverted to, an interface provided by the launcher. In another example, the profile can be used without a launcher application, such as with a managed application having a wrapper or software development kit ("SDK") compatible with the profile. An agent can also receive and utilize the profile in an example. The agent can be software installed as part of enrollment with the EMM system or can be built into the operating system ("OS") of the user device.

The first application can be received at the user device based on the user electing to download the application from an application repository, such as APP STORE or GOOGLE PLAY. In some examples, the application can be received based on instructions from a server, such as a management server or application server, for pushing the application to the user device. Pushing the application to the user device can include directly transmitting the application to the user device, in one example. In another example, the application can be stored at a location accessible to the user device, and the user device can be instructed to retrieve the application.

At stage 120, the agent or launcher can detect the launch of the first application. For example, if the user attempts to open the first application within the launcher, the launcher can report an intent to the agent indicating that the user wants to run the first application. Alternatively, the first application can be a managed application that includes a wrapper or SDK with a method that alerts the agent regarding the user's attempt to run the managed application. In either example, execution of the first application can be predicated on a compliance check by the agent or launcher. For example, the agent or launcher can retrieve the profile to determine if the first compliance settings are satisfied before allowing the first application to fully operate. This can include comparing checksums of the current device settings versus the required first compliance settings, as explained below.

In one example, the agent can lock operation of the first application until compliance settings are satisfied. This can include placing the agent or launcher in the foreground of the user device. In one example, the launcher can alter its GUI to show a prompt for changing settings in the foreground, preventing the user from accessing the first application. The agent similarly can lock itself in the foreground using, for example, a single-application mode instruction.

At stage 130, the launcher or agent can store current device settings, such as in the form of a first checksum. This can occur before or after stage 120, depending on the example. In one example, the agent determines which device settings are implicated by the profile. For example, if the first compliance settings relate to BLUETOOTH and network connectivity, at least those current device settings can be included in the first checksum. In one example, the first checksum is a hash of device-setting values and a package identifier associated with the profile. The package identifier can identify the profile itself or the first application included in the profile. The first checksum can therefore represent the initial device settings prior to the first application fully executing. The first checksum can be stored at the user device in a non-transitory, computer-readable storage medium, in an example.

At stage 140, the launcher or agent can determine whether the current device settings comply with the application-specific restrictions for the first application (i.e., the first compliance settings). This can include comparing the first checksum with a second checksum of the first compliance settings. In one example, the launcher or agent creates the second checksum using the same hash technique as used for the first checksum. For example, the profile can indicate required values for the first compliance settings. These required values can be hashed with the package identifier.

If the first and second checksums match where required or do not match where a non-match is required, this can indicate that the current device settings comply with the first compliance settings. In that case, at stage 150, the user device can execute the first application. This can include unlocking the first application for normal operation.

If the checksums do not match, then one or more of the current device settings are not as required in the first compliance settings. The agent or launcher can present a prompt to request modification of the existing device settings. This can include locking the launcher application or agent application in the foreground so that the first application cannot be used, in an example.

In one example, the agent can change the device settings automatically. In another example, the user can manually do so. When the device settings change, the agent can create a third checksum that indicates the new device settings. The launcher or agent can compare the second and third checksums to see if the new device settings are now in compliance for operation of the first application. This process can repeat until compliance is reached. Once that happens, the application can execute in the foreground at stage 150.

While the application executes at stage 150, the agent can continue monitoring device settings in one example. If the device settings change, a new checksum can be generated for comparison with the second checksum. If the comparison reveals the user device is no longer in compliance for execution of the first application, the first application can be killed, locked, or minimized while the agent or launcher is locked in the foreground. Other remedial actions are also possible. In some examples, a compliance rule can specify one or more triggering conditions that, if present, can trigger a remedial action to be performed. The remedial action can be performed by the application in one example. In some examples, the remedial action can be performed by the application in conjunction with the management server. For example, the application can request a remedial action by the management server. Remedial actions can be staged, such that a user of the user device is provided with a chance to remedy the noncompliant aspect before being subjected to additional remedial actions. Various triggering conditions and accompanying remedial actions are described in more detail below.

Additionally, in one example, the agent can restore the initial device settings of the first checksum when the first application is closed or minimized. This can allow other applications to use resources, such as BLUETOOTH or network functionality, that is disabled for compliant execution of the first application. When the first application is again opened or restored to the foreground, stages 130 and 140 can repeat prior to allowing execution at stage 150.

To further illustrate how multiple applications can function with different application-specific restrictions, an example can include a first application, second application, and agent application. The first application can be an email application with first compliance settings that require network connectivity to be active and debug mode to be off. Meanwhile, the second application can be a portal application with second compliance settings that specify if the user device is outside of a geofenced area, the portal application can block access to one of the applications available through the portal, such as by graying out an associated icon displayed in the GUI of the portal application when opened. When the user executes the email application, the device settings can be modified from initial settings, such as to turn off debug mode. The user can check email even though they are outside the geofence. When the user attempts to open the portal application, the email application is minimized. Doing so causes the agent to change the device settings back to the saved initial settings, such as those of the first checksum. Then the agent detects that GPS is off, requiring the user to change that device setting before the portal application can fully execute. In the meantime, the agent can be present in the foreground, in this example. The user can change the device settings by manually or automatically turning on GPS, and the agent then can allow the portal application to execute in the foreground. But when the user closes the portal, the initial device settings are then restored based on the first checksum.

Figure 2:
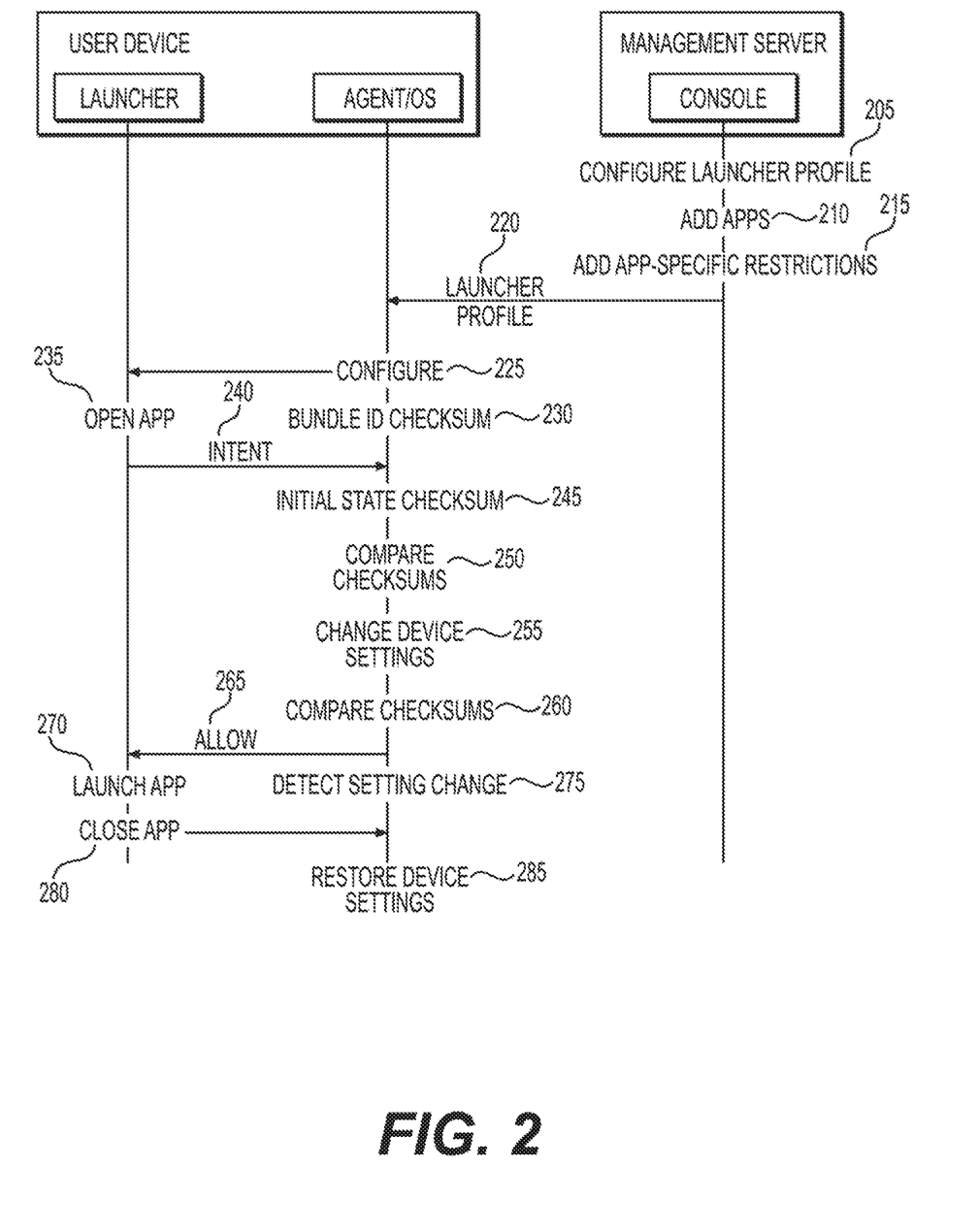
FIG. 2 is a sequence diagram of an example method for performing dynamic compliance enforcement.

FIG. 2 provides a sequence diagram of an example method for performing compliance enforcement using a launcher that executes on the user device. The launcher can work in conjunction with an agent or the OS on the user device. For convenience, this example will refer to an agent, but the same functionality could instead be performed by the OS.

Separately, a console can execute that accesses a management server. The console can include a GUI used by an administrator for performing various tasks in an EMM system. The administrator can access the console by, for example, navigating to a web location using a web browser on a computing device. The console can also be provided as a standalone application on a computing device. The administrator can use the console to perform various management activities, such as enrolling a user device, creating user groups, pushing device updates, and creating profiles for providing on-demand access to restricted resources. The console can be communicatively coupled to the management server, such that settings or instructions saved at the console are also saved at, or automatically transmitted to, the management server.

At stage 205, an administrator can use the console to configure a launcher profile. The launcher profile can specify which applications are available from within the launcher, and what compliance settings apply to the launcher. In one example, the administrator can assign the launcher profile to a user or group of users. For example, software developers can receive a first launcher profile and executives can receive a second launcher profile. These profiles can have different applications available for launch, and different compliance restrictions.

At stage 210, the administrator can add one or more applications to the launcher profile. These can be applications that will launch from within the launcher on the user device. The administrator can select from a list of applications that are configured to work with the launcher, in an example.

For any of these applications, at stage 215, the administrator can add app-specific restrictions. These can be the compliance settings that apply to that application. In one example, these compliance settings can be profile-specific, such that the same application can have different compliance settings in different launcher profiles. But, in an example, the administrator can also set default compliance settings for an application such that the application will start with a particular compliance configuration when added to any launcher profile.

Example restrictions for the compliance settings are discussed in more detail below with regard to FIG. 5. But for sake of example, they can include allowing WIFI access, allowing screenshots, allowing USB debugging, allowing shared BLUETOOTH, and allowing file sharing, among others.

At stage 220, the management server can send the launcher profile to the management agent on the computing device. Again, the management agent can be part of the OS in some examples. The management agent can configure the launcher application at stage 225. This can include configuring the launcher application to provide access to the applications identified in the launcher profile. These applications can have different compliance requirements that are specified in the launcher profile.

At stage 230, the management agent can create checksums that indicate the device settings required for compliance for the applications available at the launcher application. The checksum can be a hash of the device setting attributes and compliant values with at least one of a profile ID, application ID, or bundle ID. The bundle ID can represent a portion of the profile specific to the application, in an example.

At stage 235, the launcher application can attempt to open an application. This can occur, for example, when a user selects an application on the GUI of the launcher application. Alternatively, selecting to bring an application from the background to the foreground of the OS can also cause the launcher application to attempt to open the application at stage 235.

Opening an application can cause the launcher application to broadcast an intent that is received by the management agent at stage 240. Broadcasting an intent can include any OS-level action that communicates that the application has been launched or opened at stage 235. The management agent can then determine if the device settings comply with the compliance settings for the particular application being opened. In one example, at stage 245, the management agent creates an initial state checksum representing the device settings for at least the attributes implicated by the compliance requirements of the application. This checksum can be created by hashing the current device attributes and settings with one or more values, such as the profile ID, application ID, or bundle ID. This initial stage checksum can be stored on the user device for use in restoring device settings later.

At stage 250, the management agent can compare the compliance checksum of stage 230 with the initial state checksum of stage 245. If they are the same, then the management agent can notify the launcher application that it is allowed to open the application at stage 265. But if the comparison reveals the checksums are different, this can indicate that the current device settings do not comply with the compliance settings for the application that the user wishes to open. As a result, the management agent can cause the user device to prompt the user regarding changing the device settings to bring the user device into compliance for using the application. In one example, the launcher application can enter single application mode until the device settings are changed into compliance or the user cancels the attempt to open the application.

At stage 255, the user device can change the device settings that are revealed as non-compliant based on the checksum comparison of stage 250. This can include receiving user input giving the management agent permission to make the changes, in an example. The management agent can utilize OS functions to change the settings automatically in an example. Alternatively, the user can manually make changes to the device settings.

Upon detecting the change to the device settings, the management agent can create a new checksum for comparison against the compliance checksum at stage 260. This additional comparison can ensure that the device settings are now in compliance for using the application. If a difference still exists, stage 255 can be repeated. Otherwise, the management agent allows the launcher application to open the selected application at stage 265.

At stage 270, the launcher application can launch the selected application, allowing it to execute in the foreground. While this is happening, the management agent can continue to monitor for device setting changes. If such a change is detected at stage 275, then another checksum comparison can be performed based on the new device settings and the compliance settings for the open application. Stage 250 can repeat, with the launcher application blocking use of the selected application if the checksums do not match and allowing continued use of the application if the checksums do match.

At stage 280, the user can close or minimize the application. This can cause the management agent to restore the initial device settings at stage 285. In one example, the management agent can do so by retrieving the initial state checksum and setting the device settings accordingly. Alternatively, the user can be prompted regarding the initial device settings so that they can manually or automatically reset the device settings if they so desire.

Figure 3:
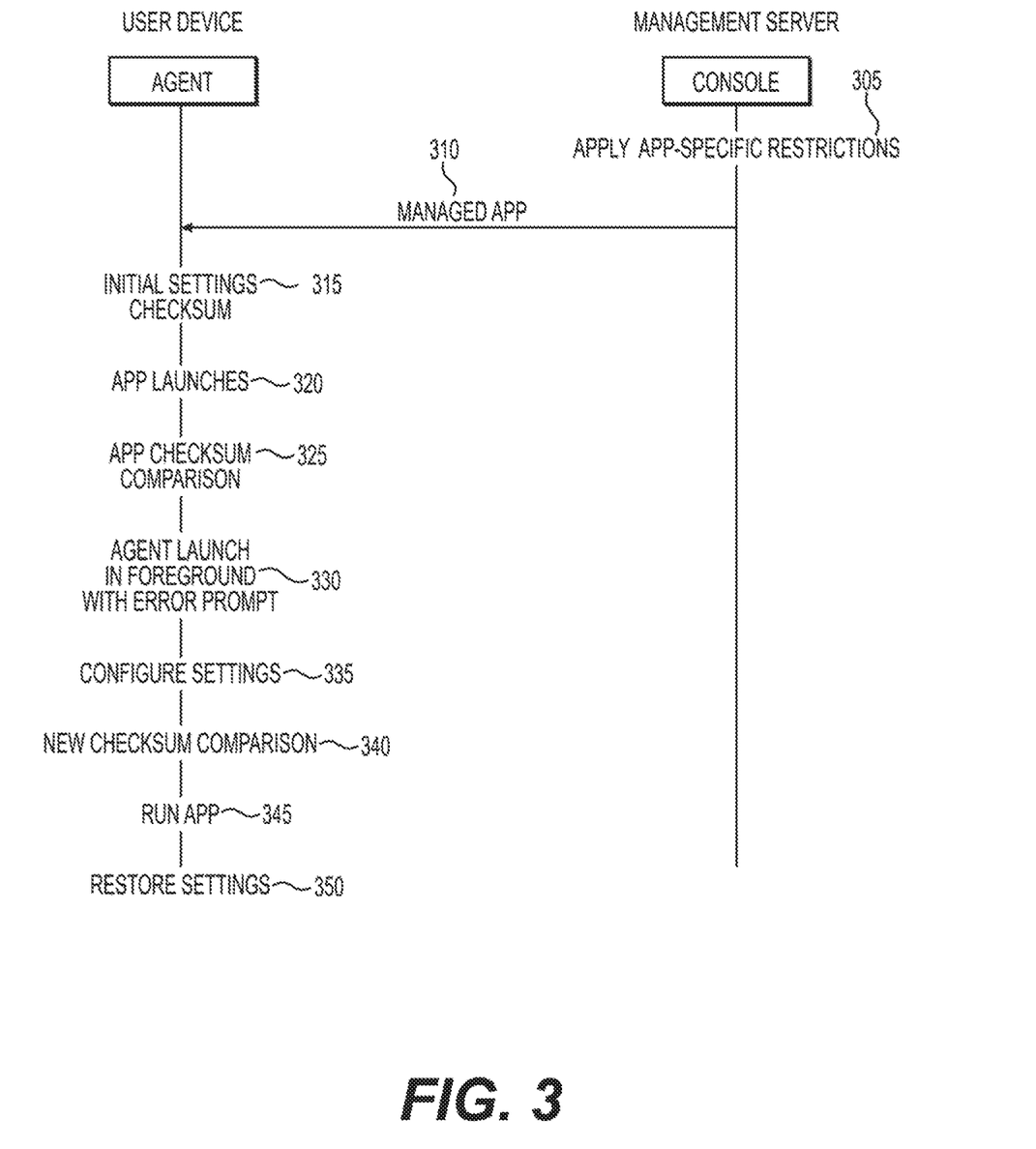
FIG. 3 is a sequence diagram of an example method for performing dynamic compliance enforcement.

FIG. 3 illustrates another exemplary method for dynamic application-level compliance enforcement. Unlike FIG. 2, this example relies on an agent but not a launcher application. A console with a GUI can provide options for applying application-specific restrictions to one or more managed applications at stage 305. These can include application-specific compliance policies, as described with regard to FIG. 2. In one example, the console GUI can present options for editing a compliance policy. In one example, the compliance policy can be created from a template. The rules can be added and removed. In one example, rules can be created and stored for easy assignment to compliance policies. The compliance policies can be further assigned to particular applications, users, or both.

A managed application can implement an SDK that allows for compliance enforcement. The compliance enforcement can be carried out by the management agent, which can be a stand-alone application, part of the managed application, part of the OS, or some combination of these. In another example, the managed application is created by wrapping a non-managed application with a wrapper that allows for the management functionality and compatibility with the compliance policies of the management server.

In one example, the profile used to enforce compliance for a managed application on a user device can include a combination of both a user compliance policy and the application-specific compliance policy. For example, if the application-specific compliance policy requires disabling BLUETOOTH and the user-specific compliance policy requires disabling WIFI and USB tethering, then the profile sent to the user device for use with the application can require disabling BLUETOOTH, WIFI, and USB tethering.

At stage 310, the managed application and profile can be provided to the user device. In one example, the user device downloads the managed application from the management server. Alternatively, the user device can download the managed application from an application server and separately download the profile from the management server. Sending the profile separately can allow the user device to receive and implement updated profiles without re-downloading the managed application, in an example. When the administrator changes compliance settings for an application already used at the computing device, the management server can send the new profile to the user device for implementation by the management agent.

At stage 315, the management agent can store initial device settings, much like already described with regard to stage 245 of FIG. 2. In one example, the management agent creates an initial state checksum by hashing current device settings corresponding to those identified in the profile with, for example, the profile ID or bundle ID. The management agent can then store this initial state checksum. This can happen before or after the managed application launches at stage 320, depending on the example. The management agent can detect launch at stage 320 based on the application or OS sending a notification or otherwise triggering a detection that the application has been opened or moved to the foreground.

When the application launches, at stage 325 the management agent can perform a checksum comparison between the compliance requirements of the profile and the initial state checksum. In the same manner discussed with regard to FIG. 2, a match can indicate that the user device is compliant for purposes of running the managed application. Otherwise, at stage 330, the management agent can launch in the foreground to prevent the user from using the managed application until the device settings are brought into compliance with the profile requirements. The management agent can present a prompt indicating what device settings need to change, in an example.

At stage 335, the management agent can change the needed device settings to bring the user device into compliance. Alternatively, the user can elect to manually do so. The management agent can then compare the modified device settings with the profile requirements at stage 340 to determine whether the user device now complies for purposes of running the managed application. If so, the management agent allows the managed application to run in the foreground at stage 345.

In one example, when the user closes the managed application or removes it from the foreground, the management agent can automatically restore the initial device settings at stage 350. To do this, the management agent can retrieve the initial state checksum and reset whichever device settings have changed. Alternatively, the management agent can use the initial state checksum to prompt the user regarding which device settings need to be changed back.

Figure 4:
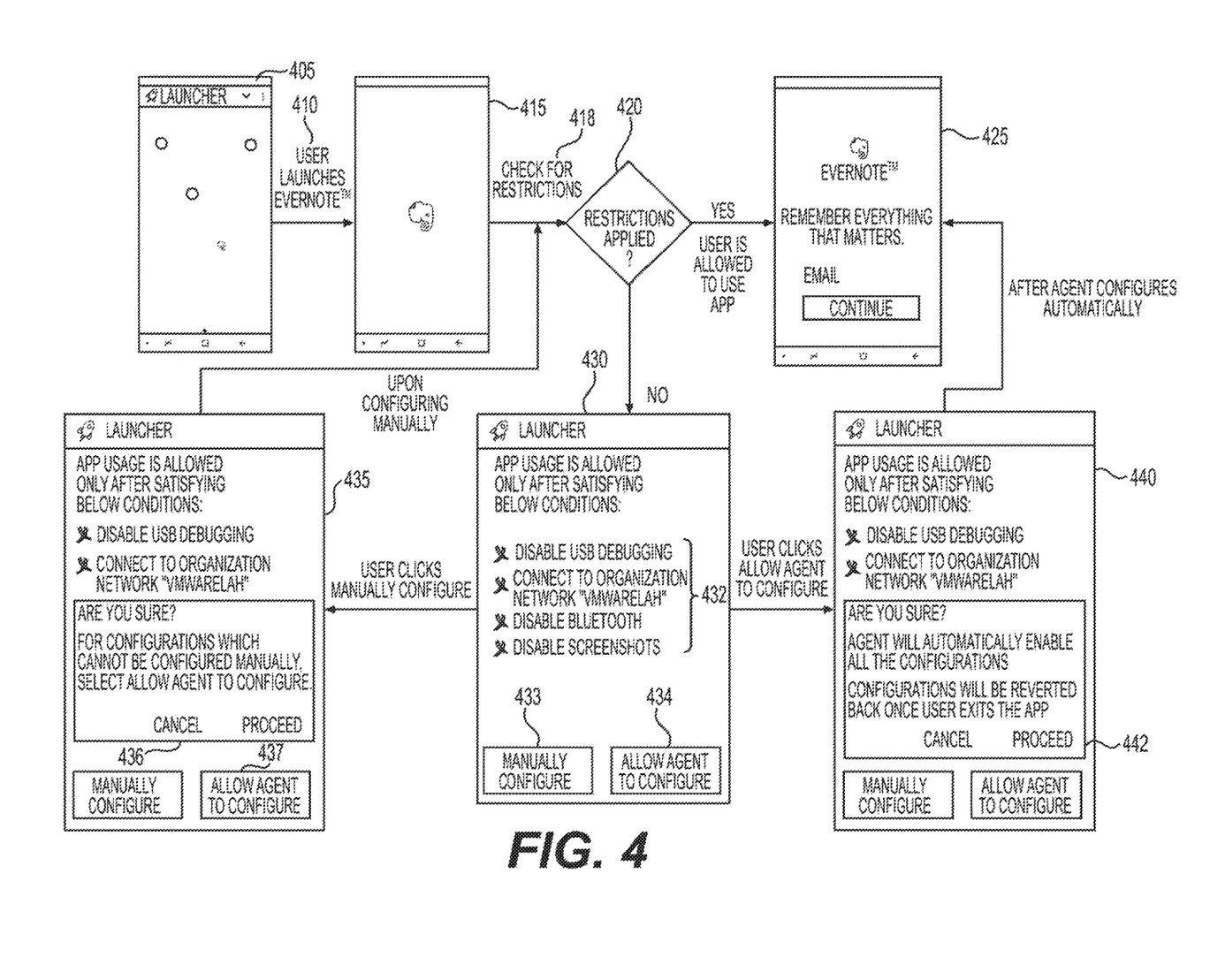
FIG. 4 is an example flow chart of example graphical user interface ("GUI") screens for enforcing application-specific compliance rules.

FIG. 4 is an example flowchart including example GUI screens on a user device. This particular example relates to using a launcher to open EVERNOTE. At screen 405, the launcher presents icons representing various applications (indicated here by circles) that can be opened from within the launcher. In this example, the user attempts to launch EVERNOTE at stage 410, which begins to load in screen

415. The launcher can send an intent to the management agent, which then checks for profile restrictions with regard to EVERNOTE at stage 418.

In one example, the profile is a launcher profile, including application-specific compliance settings (e.g., restrictions) for one or more of the applications available, including EVERNOTE, in the launcher. The management agent can use identifying information of EVERNOTE, such as an application ID, to locate the relevant compliance settings in the profile.

At stage 420, the management agent can determine whether the current device settings meet the EVERNOTE compliance settings. For example, the profile can list one or more device settings and corresponding required or prohibited values. These required or prohibited values can be compared against the user device's current values for the corresponding device settings.

If the profile restrictions are met, then the user is allowed to use the application. The management application can notify the launcher, which then allows EVERNOTE to continue operation, as shown in screen 425. If the profile restrictions are not met, then the launcher can present a prompt screen 430 to notify the user of device settings that need to change in order to run EVERNOTE. In this example, the prompt lists the various device setting changes 432 that are needed. Additionally, screen 430 provides the user with a manual configuration option 433 and automatic configuration option 434. The manual configuration option 433 can allow the user to navigate the device settings of the user device and make changes as they see fit. The automatic configuration option 434 can cause the management agent to attempt to change the device settings for compliance with the profile restrictions for EVERNOTE.

In some cases, configuring device settings may be difficult to do manually, or even not within the standard GUI options. Screen 435 shows a prompt 436 warning the user of such a scenario and giving them another chance to choose automatic configuration. If the user would then prefer automatic configuration, they can select that option 437. Likewise, screen 440 ensures the user wishes to allow automatic configuration by displaying an additional prompt 442.

The management agent then compares the new device settings against the profile compliance settings for EVERNOTE. If the new device settings are still noncompliant, screen 430 can further direct the user. Once the new device settings comply, then the management agent can notify the launcher, which then allows EVERNOTE to continue running at stage 425.

Figure 5:
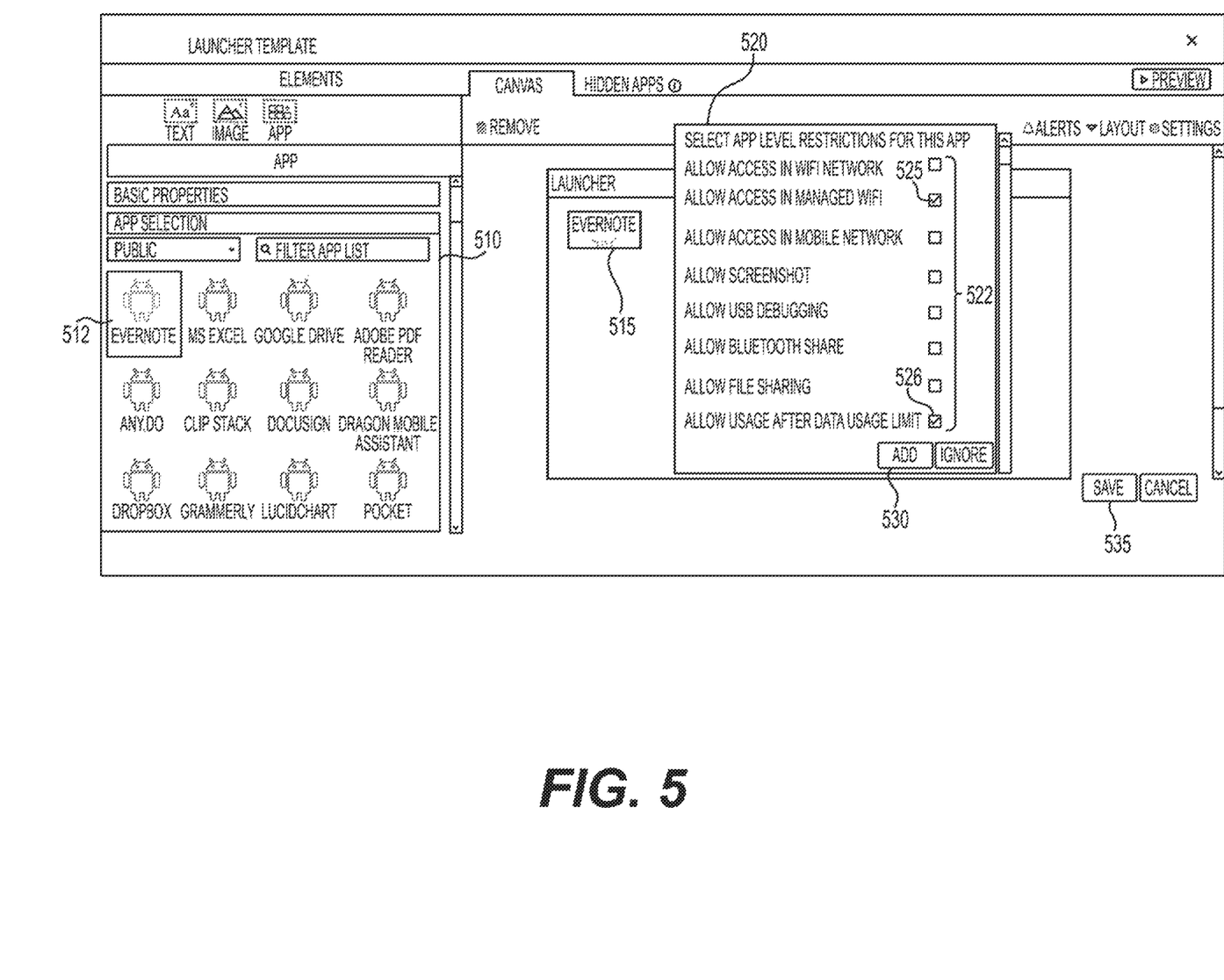
FIG. 5 is an example GUI for assigning application-specific compliance rules.

FIG. 5 illustrates an example administrative console for assigning application-specific restrictions and creating a launcher profile. In this example, the GUI contains a list of applications 510 that can be included in the launcher. The administrator can select one or more of these applications to add to a launcher profile, which can determine which applications are available within the launcher on a user device. Different users or groups of users can be assigned different launcher profiles. In this example, the administrator has selected the EVERNOTE application 512. EVERNOTE can be a non-managed application that the launcher controls access to. For example, the management agent can cause the launcher to restrict and grant access to EVERNOTE based on whether the device settings are compliant with the application-specific restrictions for EVERNOTE in the launcher profile. Alternatively, EVERNOTE can be a managed application created by wrapping a standard version of EVERNOTE with SDK functionality. The SDK can allow management functions based on a compliance policy defined in the launcher profile.

The selected application 512, EVERNOTE, can appear as an icon 515 in the "LAUNCHER" pane, which can indicate which applications will be available in the launcher. The console can provide a restriction pane 520 for selecting application-specific restrictions 522 to apply to the selected application 512, in this case EVERNOTE. In this example, the restriction pane 520 includes administrator selections 525, 526 of restrictions 522 to "allow access in managed WIFI" and "allow usage after data usage limit." The selected restrictions 525, 526 in this example allow the EVERNOTE application to operate while the device is in a managed WIFI state and also when the user device is beyond its data limit. Other restrictions can prevent operation of an application in certain conditions. These selected application-specific restrictions 525, 526 can be added to EVERNOTE with the add button 530. This can create an application-specific compliance policy for EVERNOTE, in an example. The administrator can select a save button 535 to apply the EVERNOTE compliance policy to the launcher profile, which can consist of one or more profiles that are sent to the user device from the management server.

In one example, different launcher profiles can be created for different users or groups of users. The different launcher profiles can apply different compliance policies to the same application, such as EVERNOTE.

Figure 6:
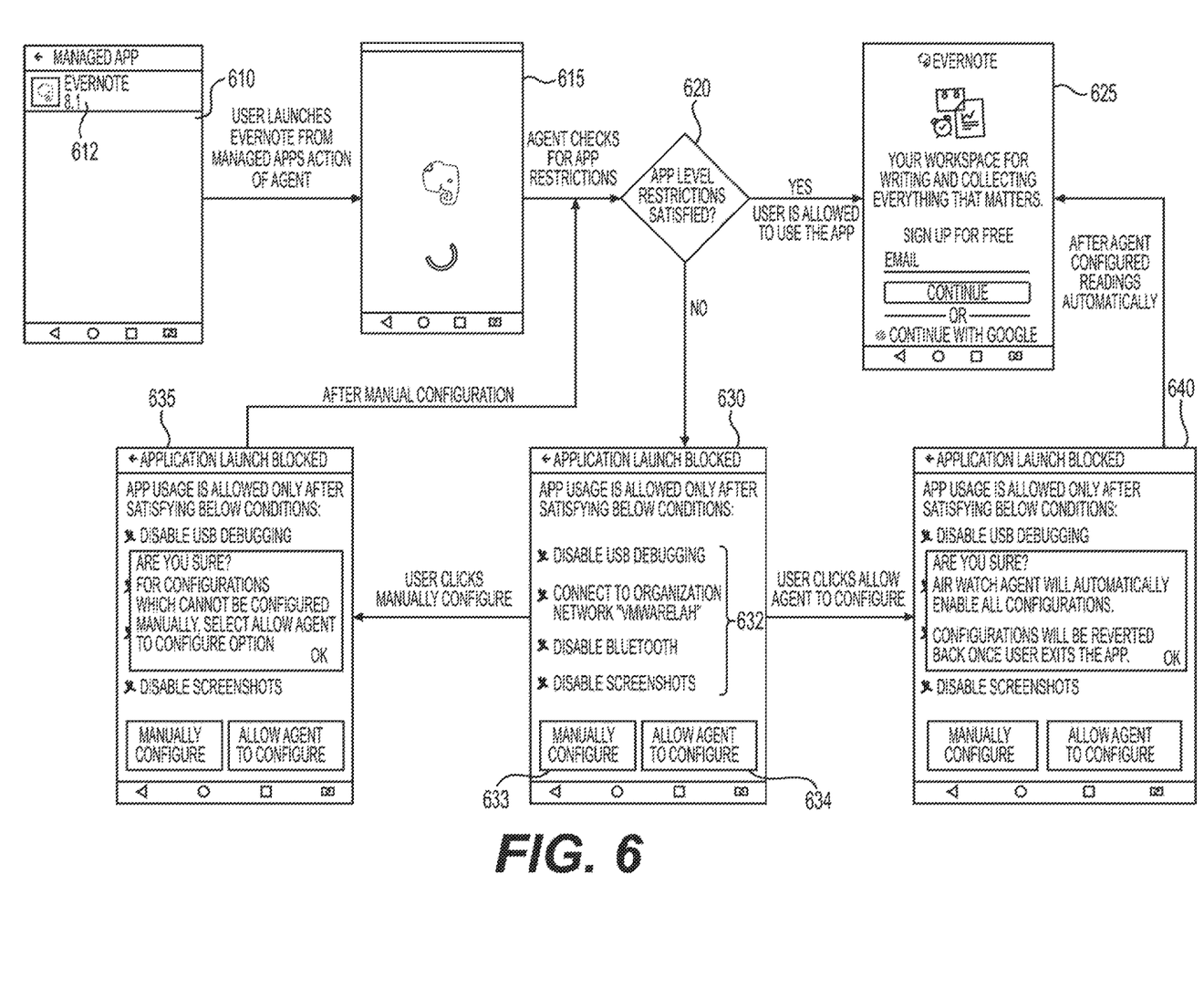
FIG. 6 is an example flow chart of example GUI screens for enforcing application-specific compliance rules.

FIG. 6 is an example flowchart including example GUI screens on a user device. These relate to example use of a management agent to control operation of one or more managed applications based on application-specific compliance policies. At screen 610, the GUI allows the user to open the managed application 612, EVERNOTE. This managed application 612 can include a standard version of EVERNOTE wrapped in code that includes the SDK for management functionality. Alternatively, the managed application itself may be compiled to implement the SDK directly without a wrapper.

When the managed application 612 launches, it can notify the management agent. The management agent can be part of the managed application 612 or separate from it, depending on the example. At screen 615, the managed application 615 can be paused while the management agent determines if the devices settings comply with the application-specific profile. In one example, the management agent locks itself in the foreground in front of the managed application 612 to prevent the user from using EVERNOTE until compliance is affirmed.

At stage 620, the management agent can check compliance by determining if the application-specific restrictions are satisfied. This can include locating a profile with an identifier corresponding to the managed application 612, in an example. The compliance settings in that profile can be compared against current device settings. This can include comparing checksums of the current setting values versus the compliance values. As already explained, the checksums can be hashes of the device settings and values with, for example, the profile ID, package ID, or application ID.

If the comparison shows that the current device settings comply with the application-specific restrictions, then the management agent can allow EVERNOTE to run in the foreground, such as in screen 625. Otherwise, the management agent can prompt the user to satisfy the application-specific restrictions, such as in screen 630. The management agent can determine which device setting values need to change, and display the changes needed 632 for compliance.

The management agent can present a first button 633 for manual configuration and a second button 634 for management agent configuration. After either such selections, screens 635 and 640 can act as confirmation.

The current settings can be saved for future restoration. The new device settings can be compared against the application-specific restrictions to see if the new device settings are compliant. If so, then the management agent can allow the managed application 612 to run in the foreground, such as in screen 625.

Figure 7:
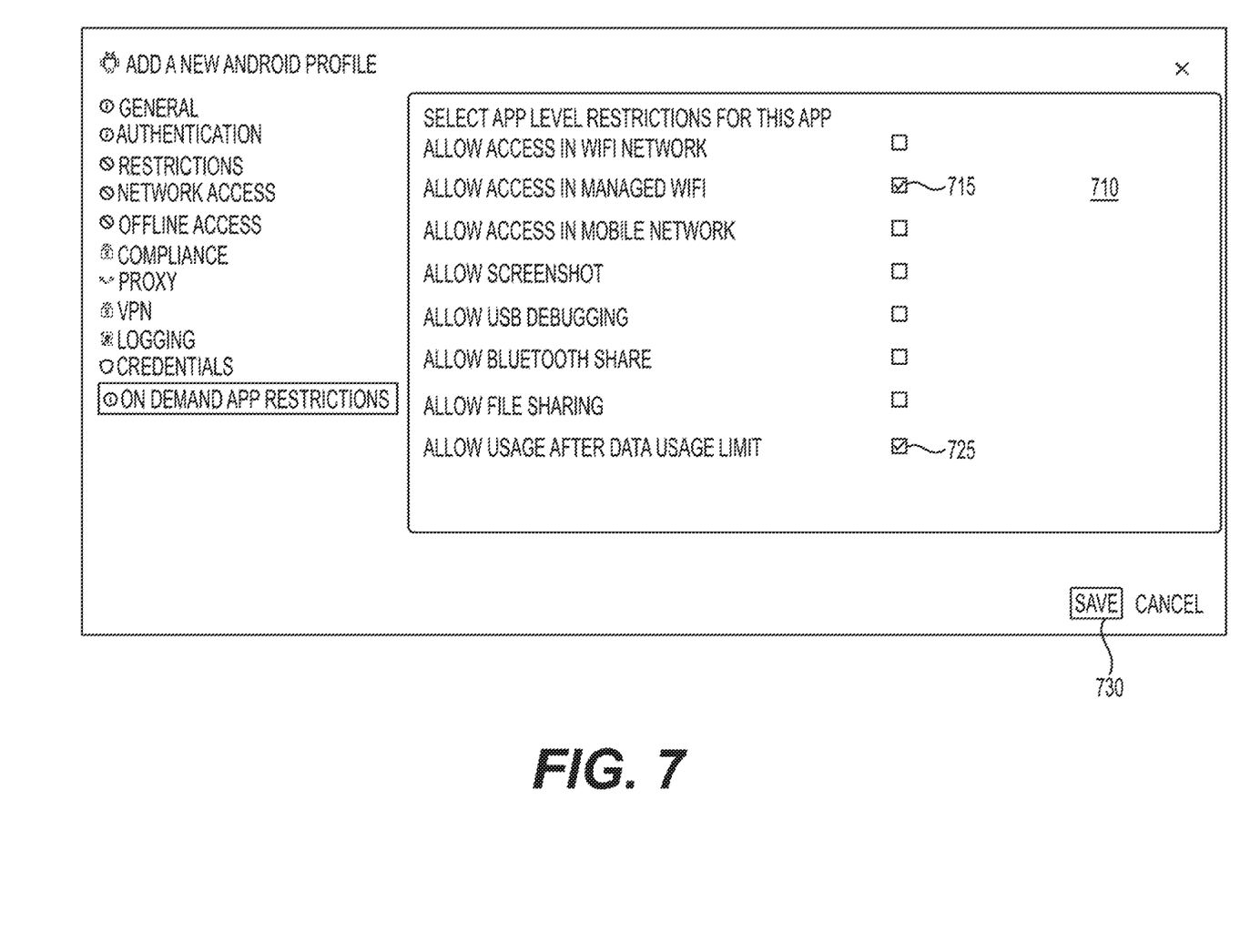
FIG. 7 is an example GUI for assigning application-specific compliance rules.

FIG. 7 illustrates an example administrative console for assigning application-specific restrictions and creating an application-specific profile. In this example, pane 710 includes various available restrictions that can be assigned to a managed application. The administrator can select which ones to apply, such as at checkboxes 715, 725. Then, the GUI allows the administrator to save the restrictions to the application-specific profile by using a save button 730.

In another example, a similar GUI can allow the administrator to define user-specific profiles. The combination of the user-specific and application-specific profile can govern which device settings are needed for compliance in opening a managed application.

Figure 8:
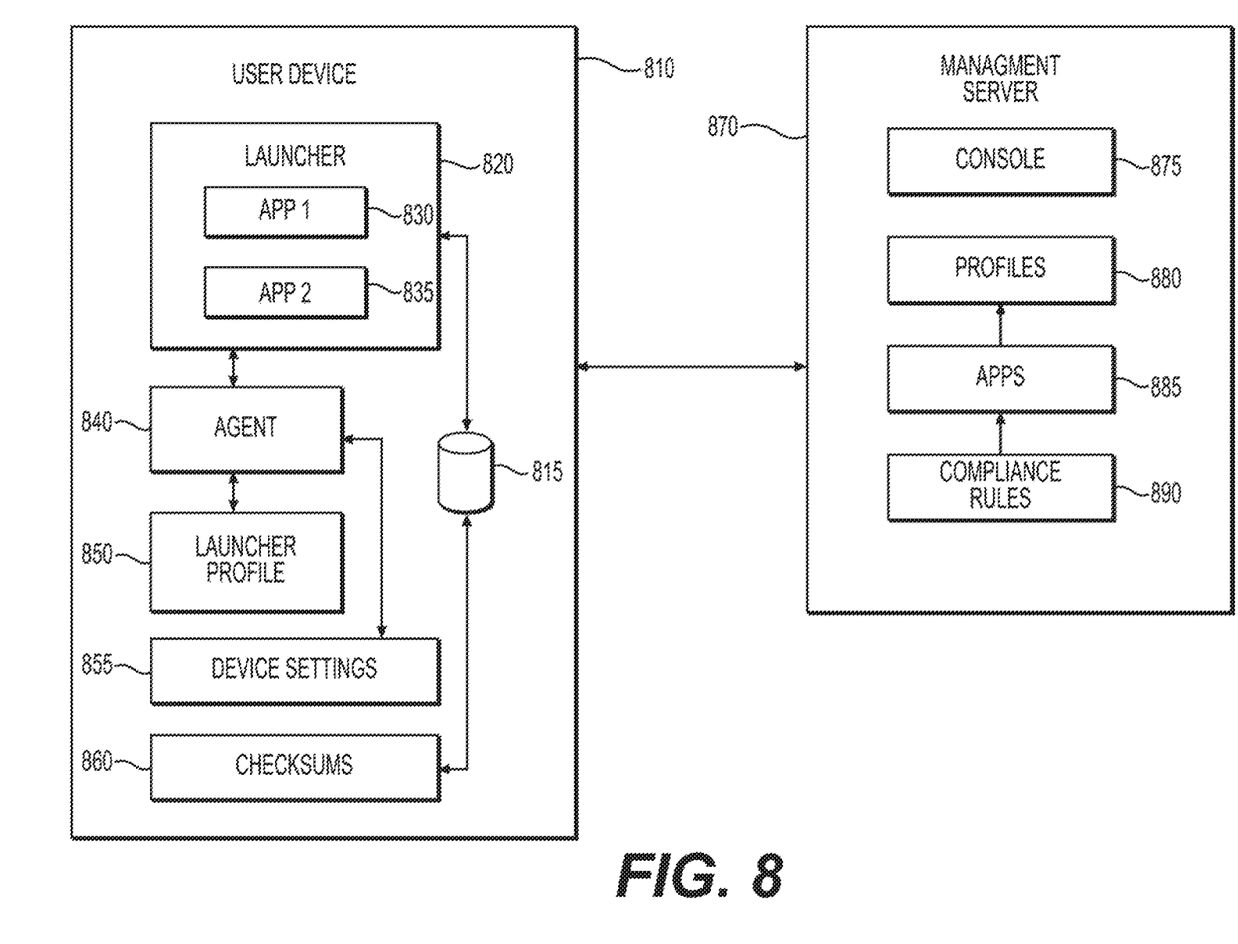
FIG. 8 is a system diagram of an example system for performing the example methods disclosed herein.

FIG. 8 is a system diagram of an example system for performing the example methods discussed above. The system includes a console 875 that is communicatively coupled to a management server 870. An administrator can utilize the console 875 to configure a compliance rule 890, such as by utilizing a GUI as shown in FIGS. 5 and 7. The GUI can be displayed on the console 875. An administrator can access the console 875 by, for example, navigating to a web location using a web browser on a computing device. The console 875 can also be provided as a standalone application on a computing device. The administrator can use the console 875 to perform various management activities, such as enrolling a user device, creating user groups, pushing device updates, and creating profiles for users or user devices. Because the console 875 can be communicatively coupled to the management server 870, settings or instructions saved at the console 875 can also be saved at, or automatically transmitted to, the management server 870.

The management server 870 can include multiple servers, processors, and computing devices. In some examples, the management server 870 is a network of servers, some of which can be located remotely from one another. In another example, the management server 870 is a single server with multiple purposes. In yet another example, the management server 870 is a server (or group of servers) dedicated to the operations described herein. A system administrator can have privileges associated with managing, editing, revising, and otherwise administrating functions associated with the management server 870. The administrator can perform these functions through the console 875, for example.

In one example, the console 875 allows the administrator to assign compliance rules to specific applications 885. This can create profiles 800 that track which compliance rules 890 are required for specific applications 885. The profiles 880 can be application-specific, user-specific, or launcher profiles that include compliance settings for one or more applications available in the launcher.

A user device 810 can include a first application 830 and second application 835 that can be governed by different application-specific restrictions. In the illustrated example, these applications are launched by a launcher 820. The launcher 820 can be an environment within which the first and second applications 830, 835 can operate or from which they can be launched. In some examples, the launcher can function as a replacement interface for the user device, such that the "home screen" of the user device is replaced by, or diverted to, an interface provided by the launcher. Alternatively, the first and second applications 830, 835 can be managed applications that operate without a launcher 820.

The management server 870 can send a profile 880 (850) to the user device 810 for use with the launcher 820 or an application 830, 835. A management agent 840 installed on the user device 810 can determine application-specific restrictions to apply to applications 830, 835 based on the profile 850. The applications 830, 835 on the user device 810 can utilize application-specific compliance rules from one or more profiles 850. The profiles 850 can be stored in memory storage locations dedicated for use by the applications 830, 835 or can be stored in the storage location 815 of the user device 810. The management agent 840 can be an application dedicated to management functionality, such as enforcing device-level or application-level compliance rules established at the management server 870.

The management agent 840 can access device settings 855 on the user device. These device settings 855 can be any settings that the OS allows to change, such as system settings, hardware settings, or application settings. The management agent 840 can create various checksums 860 that represent values of the device settings 855 and application-specific restrictions of the profile 850.

The user device 810 can be any computing device, such as a smartphone, laptop, tablet, personal computer, or workstation. A user device 810 can include a non-transitory, computer-readable medium 815 containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

Additionally, the management server 870 can include an enrollment component and an administrator component, which can both be used for the process of enrolling a user device 810 in an EMM system. For example, a user device 810 can communicate with the enrollment component during the initial stages of enrollment. In some examples, the enrollment component can provide a token to the user device 810 indicating that the user device 810 has been authenticated and is permitted to communicate and enroll with the management server 870. The management server 870 or enrollment component can provide the user device 810 with information regarding how to access and communicate with the administrator component in order to continue the enrollment process.

In some examples, the administrator component can request a token from the user device 810, indicating that the user device 810 has been authenticated and is permitted to continue the enrollment process with the administrator component. Upon receiving the token, the administrator component can continue the enrollment process. The administrator component can also provide a console for an administrator to configure and monitor the status of the user device 810 and the enrollment process. In some examples, the administrator component can be dedicated to a particular enterprise or group of enterprises, while the enrollment component can be shared across multiple different enterprises.

The enrollment and administrator components of the management server 870 can be utilized when the user device 810 is a managed device. However, the application-specific compliance enforcement discussed within this disclosure can be applied to an unmanaged device without any communication to or from a management server 870 or console 875. For example, the console 875 can be used to configure an application 830, 835 that is available from a public application store. In that example, the profiles 850 can be contained within the corresponding application 830, 835 and can be downloaded onto the user device 810 by downloading the application 830, 835 to the user device.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for compliance enforcement, comprising:
   receiving, at a user device from a management server, a profile including first compliance settings for a first application that are different than second compliance settings for a second application;
   detecting launch of the first application;
   storing current device settings that correspond to the first compliance settings, including storing a first checksum representing the current device settings;
   determining whether the current device settings meet the first compliance settings, including comparing the first checksum to a second checksum for the first compliance settings;
   when the first and second checksums differ, prompting the user regarding which of the current device settings change;
   changing the current device settings to modified settings;
   storing a third checksum for the modified settings; and
   executing the first application in a foreground when the modified settings meet the first compliance settings, based on the second and third checksums matching.

2. The method of claim 1,
   wherein the first application executes in the foreground when the first and second checksums match.

3. The method of claim 1, wherein a launcher application on the user device provides access to the first and second applications and launches the first application, wherein an agent detects the launch of the first application and determines whether the first and second checksums match.

4. The method of claim 1, further comprising:
   during execution of the first application, detecting a change to the device settings;
   comparing the second checksum against a fourth checksum for the changed device settings; and
   based on the comparison, blocking execution of the first application.

5. The method of claim 1, further comprising:
   detecting that the first application is closed or minimized; and
   restoring the device settings based on the stored current device settings.

6. The method of claim 1, wherein the first and second applications are executed by a launcher application, and wherein the launcher application provides access to the first and second applications, both of which are identified by the profile.

7. The method of claim 1, wherein the first and second compliance settings have different network connectivity requirements from one another, and wherein switching between applications causes the user device to change the current device settings.

8. A non-transitory, computer-readable medium comprising instructions that, when executed by a processor of a user device, perform stages for performing compliance enforcement, the stages comprising:
   receiving, at the user device from a management server, a profile including first compliance settings for a first application that are different than second compliance settings for a second application;
   detecting launch of the first application;
   storing current device settings that correspond to the first compliance settings, including storing a first checksum representing the current device settings;
   determining whether the current device settings meet the first compliance settings, including comparing the first checksum to a second checksum for the first compliance settings;
   when the first and second checksums differ, prompting the user regarding which of the current device settings change;
   changing the current device settings to modified settings;
   storing a third checksum for the modified settings; and
   executing the first application in a foreground when the modified settings meet the first compliance settings, based on the second and third checksums matching.

9. The non-transitory, computer-readable medium of claim 8,
   wherein the first application executes in the foreground when the first and second checksums match.

10. The non-transitory, computer-readable medium of claim 8, wherein a launcher application on the user device provides access to the first and second applications and launches the first application, wherein an agent detects the launch of the first application and determines whether the first and second checksums match.

11. The non-transitory, computer-readable medium of claim 8, the stages further comprising:
    during execution of the first application, detecting a change to the device settings;
    comparing the second checksum against a fourth checksum for the changed device settings; and
    based on the comparison, blocking execution of the first application.

12. The non-transitory, computer-readable medium of claim 8, the stages further comprising:
    detecting that the first application is closed or minimized; and
    restoring the device settings based on the stored current device settings.

13. The non-transitory, computer-readable medium of claim 8, wherein the first and second applications are executed by a launcher application, and wherein the launcher application provides access to the first and second applications, both of which are identified by the profile.

14. The non-transitory, computer-readable medium of claim 8, wherein the first and second compliance settings have different network connectivity requirements from one another, and wherein switching between applications causes the user device to change the current device settings.

15. A system for performing compliance enforcement, comprising:
- a user device having a processor and memory storage;
- wherein the memory storage contains a non-transitory, computer-readable medium comprising instructions that, when executed by the processor, carry out stages comprising:
  - receiving, at the user device from a management server, a profile including first compliance settings for a first application that are different than second compliance settings for a second application;
  - detecting launch of the first application;
  - storing current device settings that correspond to the first compliance settings, including storing a first checksum representing the current device settings;
  - determining whether the current device settings meet the first compliance settings, including comparing the first checksum to a second checksum for the first compliance settings;
  - when the first and second checksums differ, prompting the user regarding which of the current device settings change;
  - changing the current device settings to modified settings;
  - storing a third checksum for the modified settings; and
  - executing the first application in a foreground when the modified settings meet the first compliance settings, based on the second and third checksums matching.

16. The system of claim 15,
- wherein the first application executes in the foreground when the first and second checksums match.

17. The system of claim 16, wherein a launcher application on the first user device provides access to the first and second applications and launches the first application, wherein an agent detects the launch of the first application and determines whether the first and second checksums match.

18. The system of claim 15, the stages further comprising:
- during execution of the first application, detecting a change to the device settings;
- comparing the second checksum against a fourth checksum for the changed device settings; and
- based on the comparison, blocking execution of the first application.

19. The system of claim 15, the stages further comprising:
- detecting that the first application is closed or minimized; and
- restoring the device settings based on the stored current device settings.

20. The system of claim 15, wherein the first and second compliance settings have different network connectivity requirements from one another, and wherein switching between applications causes the user device to change the current device settings.

* * * * *